(12) United States Patent
Fang

(10) Patent No.: US 11,305,933 B2
(45) Date of Patent: Apr. 19, 2022

(54) FLUID DISCHARGE SYSTEM AND SQUEEZER THEREOF

(71) Applicant: SHANGHAI HONGYAN RETURNABLE TRANSIT PACKAGINGS CO., LTD., Shanghai (CN)

(72) Inventor: Zhengwei Fang, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 38 days.

(21) Appl. No.: 16/636,294

(22) PCT Filed: Jul. 27, 2018

(86) PCT No.: PCT/CN2018/097330
§ 371 (c)(1),
(2) Date: Feb. 3, 2020

(87) PCT Pub. No.: WO2019/024770
PCT Pub. Date: Feb. 7, 2019

(65) Prior Publication Data
US 2021/0179346 A1    Jun. 17, 2021

(30) Foreign Application Priority Data

Aug. 3, 2017  (CN) .......................... 201710657558.0

(51) Int. Cl.
B65D 88/54    (2006.01)
B65D 77/06    (2006.01)
(Continued)

(52) U.S. Cl.
CPC ........... *B65D 88/54* (2013.01); *B65D 77/065* (2013.01); *B65D 90/00* (2013.01); *B67D 7/0216* (2013.01);
(Continued)

(58) Field of Classification Search
CPC ...... B65D 88/54; B65D 77/065; B65D 90/00; B65D 2590/046; B67D 7/0216; B67D 2210/0016
See application file for complete search history.

(56) References Cited

U.S. PATENT DOCUMENTS 5,118,011 A    6/1992  Kopp
5,490,613 A    2/1996  Taylor et al.
(Continued)

FOREIGN PATENT DOCUMENTS

CN    1498183 A      5/2004
CN    107472724 A    12/2017
(Continued)

OTHER PUBLICATIONS

International Search Report (in Chinese and in English) and Written Opinion issued in PCT/CN2018/097330, dated Oct. 26, 2018, total 11 pages provided.
(Continued)

*Primary Examiner* — Frederick C Nicolas
(74) *Attorney, Agent, or Firm* — Hamre, Schumann, Mueller & Larson, P.C.

(57) ABSTRACT

A fluid discharge system and the squeezer, where the squeezer includes a pair of rollers, a driving device, and a mounting bracket. The pair of rolling shafts is rotatably mounted to the mounting bracket, and each rolling shaft has a mounting parts at both ends and a squeezing segment between the mounting parts. The squeezing segment includes a supporting shaft and an elastic body provided (Continued)

around the supporting shaft. A pair of rolling shafts can operatively clamp the object to be clamped between the squeezing segments and can rotate oppositely through a driving device to apply a squeezing force to the clamped object. The driving device includes a motor, wherein the motor is mounted around the rolling shaft. The fluid discharge system and the squeezer are a zero-residue discharge system without liner suspension, have a long effective squeezing length, and are easy to operate.

20 Claims, 7 Drawing Sheets

(51) Int. Cl.
  *B67D 7/02* (2010.01)
  *B65D 90/00* (2006.01)
(52) U.S. Cl.
  CPC .............. *B65D 2590/046* (2013.01); *B67D 2210/0016* (2013.01)

(56) References Cited

U.S. PATENT DOCUMENTS

| | | | |
|---|---|---|---|
| 5,765,723 A | 6/1998 | Wilcox | |
| 5,875,929 A * | 3/1999 | Nguyen | B65D 35/285 222/102 |
| 6,547,099 B1 * | 4/2003 | Farris | A61M 1/0078 222/102 |
| 7,111,758 B1 * | 9/2006 | Monks | A47K 1/09 222/102 |
| 2004/0216427 A1 | 11/2004 | Schroeder et al. | |
| 2015/0284181 A1 | 10/2015 | Sullinger et al. | |
| 2017/0096293 A1 * | 4/2017 | Sullinger | B30B 9/20 |

FOREIGN PATENT DOCUMENTS

| | | |
|---|---|---|
| CN | 207275421 U | 4/2018 |
| EP | 3498625 A1 | 6/2019 |
| JP | 3002156 U | 9/1994 |
| JP | 3043307 U | 9/1997 |
| JP | 2014525375 A | 9/2014 |
| WO | 2011080402 A1 | 7/2011 |
| WO | 2013030455 A1 | 3/2013 |
| WO | 2015192789 A1 | 12/2015 |

OTHER PUBLICATIONS

The extended European search report issued in European Application No. 18840619.3, dated Mar. 24, 2021.

Notice of Reason for Refusal issued in Japanese Application JP20200505381, dated Mar. 30, 2021, with English machine translation.

* cited by examiner

FLUID DISCHARGE SYSTEM AND SQUEEZER THEREOF

CROSS REFERENCE TO RELATED APPLICATIONS

This patent application the priority of Chinese patent application 201710657558.0, entitled "fluid discharge system and the squeezer thereof" filed on Aug. 3, 2017; the entire disclosure thereof is incorporated herein by reference

TECHNICAL FIELD

This invention relates to logistics transportation field, and in particular a transportation and discharge system for liquid, especially viscous liquid.

TECHNICAL BACKGROUND

There are many liquid storage devices in the market for storage, transportation, filling, discharging and the like of viscous liquid.

U.S. Pat. No. 5,765,723A discloses a sealed liquid bag, the body thereof is a sealed soft container made by hot-melting welding or high-frequency welding PVC plastic-coated cloth; the sealed soft container is provided with an inlet valve and an outlet valve at two ends thereof. This liquid liner bag body is effective when using in the high speed low viscous liquid; however, during viscous liquid discharging, the discharge is inefficient; there are much liquid residues in the bag after discharging, rendering waste of liquid. Generally, at the end of discharging, the liner bag is twisted by spirally twisting and squeezing the body thereof to squeeze the liquid residues out.

IL156984A discloses a sealed liquid bag, the body thereof is a sealed soft container made by hot-melting welding or high-frequency welding PVC plastic-coated cloth or PE film; the sealed soft container is provided with an inlet valve and an outlet valve at two ends thereof; the body also includes a gas bag for assisting in discharging, with an gas charging port on the gas bag. During liquid discharging, the assisted gas bag need to be charged with gas, the viscous liquid is discharged by the squeezing of the gas. This solution cannot solve the problem of liquid residues completely, and assisted gas charging is needed, rendering the increase of cost.

US2015284181A1 discloses a sealed liquid bag, the body thereof is a sealed soft container made by hot-melting welding or high-frequency welding PVC plastic-coated cloth or PE film; when viscous liquid discharging, the intermediate bulk container for transporting liquid is tilted by mechanical structure so that the discharging outlet is located at the lowest position. Such an operation is time consuming, inefficient, and inconvenient, further there are much liquid residues in the liner bag after discharging, rendering waste of liquid.

WO2011080402A1 discloses a liquid squeezing device for squeezing viscous liquid. The sealed liquid bag has to be hanged before squeezing, then with the squeezing of the hanged liquid bag, the hanged liquid bag is pulled upwardly. These squeezing device is costly and bulky, and the operation is complicated, time-consuming, inefficient and difficult.

SUMMARY

The invention aims to provide a simple, compact, cost-effective, operation friendly, and durable squeezer with little liquid residue in the squeezed liner bag.

To achieve the above object, according to an aspect of the present invention, it is provided A squeezer, comprising: a pair of rolling shafts, a driving device and a mounting bracket, wherein the pair of rolling shafts being rotatably mounted to the mounting bracket, each rolling shaft having a mounting part at each end and a squeezing segment located between the mounting parts; the squeezing segment including a supporting shaft and an elastic body surrounding the supporting shaft; the pair of rollers being capable of operatively clamping an object to be clamped between the squeezing segments and oppositely being rotated by the driving device to apply a squeezing force to the object clamped, and the driving device including a motor, wherein the motor being mounted around the rolling shaft.

In an embodiment, the motor is arranged such that at least a part of its projection in a direction perpendicular to the axis of the rolling shaft overlaps with the projection of the rolling shaft in a direction perpendicular to the axis of the rolling shaft.

In an embodiment, the motor is located below, above, or aside of the rolling shaft.

In an embodiment, the mounting bracket comprises a first base and a second base respectively arranged at both ends of the rolling shaft, wherein the driving device is arranged at the second base.

In an embodiment, the motor extends from the second base toward the middle portion of the rolling shaft.

In an embodiment, one side of the second base is provided with an upper recess and a lower recess below the upper recess, wherein one end of the motor is mounted in the upper recess, and the rolling shaft is installed to the lower recess.

In an embodiment, the driving device further includes a reducer, wherein the reducer is mounted to the side of the second base which is opposite to the side where the upper recess and the lower recess is provided, and a driving slot of the reducer is connected to the rolling shaft.

In an embodiment, the driving device further includes a reducer, wherein the motor is arranged above the reducer, and the output shaft of the motor is connected with the reducer and extends upward from the reducer.

In an embodiment, one of the pair of rolling shafts is received in the reducer, and the other is received in the second base.

In an embodiment, the motor has a cover arranged above the reducer and extending upward from the reducer.

In an embodiment, the mounting bracket comprises two first bases, two supporting rods, a second base and a locking mechanism; two ends of each of the two supporting rods are connected to the first base and the second base respectively; one end of the rolling shaft is rotatably mounted to the first base, the other end is rotatably mounted to the second base, and the locking mechanism is used to operatively lock or release the pair of rolling shafts.

In an embodiment, the squeezer further comprises a protective device, wherein the protective device is provided to surround at least the outer side of the rolling shaft so that the outer side of the rolling shaft is separated from the object clamped during squeezing of the squeezer.

In an embodiment, the mounting bracket comprises a first base, a supporting rod, and a second base; and two ends of the supporting rod are connected to the first base and the second base respectively, one end of the rolling shaft is rotatably installed in the first base, the other end is rotatably installed in the second base, and the cross section of the supporting rod is U-shaped or C-shaped.

According to yet another aspect of the present invention, it is provided a fluid discharge system, comprising a container and an liner bag, wherein the liner bag being provided with a discharge port and installed in the container, wherein the fluid discharge system further comprises the squeezer mentioned above, wherein the pair of rolling shafts are able to operatively clamp the liner bag between the squeezing segments and are able to oppositely rotated by the driving device to apply a squeeze force to the liner bag.

Preferably, an outer diameter of at least a part of the elastic body is uniformly changed in the axial direction, thereby forming an elastic body having a taper.

Preferably, the object to be clamped is a liner bag for containing liquid, and the pair of rollers are arranged to be capable of descending as the liquid in the inner liner bag is lowered while rotating relatively in the opposite direction.

Preferably, the cross section of the roller is circular or oval.

The fluid discharge system provided by the present application is a zero-residue discharge system needing not to hanging the liner bag, and has a simple structure, a good manufacturing process, simple operation, and cost savings.

DESCRIPTION OF DRAWINGS

FIGS. 12-13 show the variant of the squeezer in FIGS. 4-6, wherein FIG. 12 is the explosive perspective view, and FIG. 13 is the sectional view.

DETAILED DESCRIPTION

The preferred embodiments of this invention will be described in detail with reference to the accompanying drawings, so that the purposes, the characteristics and the advantages of the invention can be more clearly understood. It should be understood that the embodiments shown in the figures are not intended to limit the scope of this invention, but illustrate the essential spirit of the technical solution of this invention.

Description for Terms

Intermediate bulk container: composite intermediate bulk container (hereinafter referred to as IBC container) is a type of packaging and transportation containers widely used in the food, biochemical, pharmaceutical, chemical and other industries in the world. Since IBC container barrels can be reused many times, they have obvious advantages in filling, storage, and transportation, and compared to cylindrical barrels, IBC container barrels can save 35% of storage space, the dimensions accord with ISO standards, and not only applicable to sterile filling but also compact, convenient for safe and efficient storage in large scale, so it is widely used in the transportation, packaging, and storage of liquids, particles, and flakes etc. At present, there are three types of existing specifications: 820 L, 1000 L, and 1250 L. Generally, their structure includes a plastic liner (liner bag), a filling port, a draining device (a valve or a simple draining port, etc.), a side plate, a base and a cover.

The squeezer of the present invention includes at least a pair of squeezing members, such as at least two rolling shafts. When the liquid in the liner bag is needed to be discharged, the two rolling shafts clamp the liner bag, and under the driving of the driving device, the two rolling shafts rotate relative to each other to squeeze out the liquid in the liner bag, and during liquid discharging, with the reducing of the liquid in the liner bag, the two rolling shafts are always automatically descend as the liquid level decreases and squeeze the liquid under the driving of the driving device. Herein, the squeezing force is produce squeezing and pushing effect to an object, for example the liner bag and the liquid contained therein.

Next, the embodiments of this invention are described reference to figures.

The First Embodiment

Figure 1:
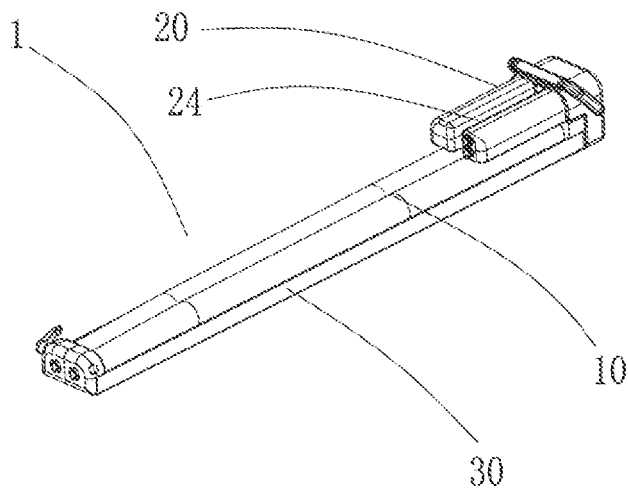
FIG. 1 is the perspective view of the squeezer according to the first embodiment of this invention.
Figure 2:
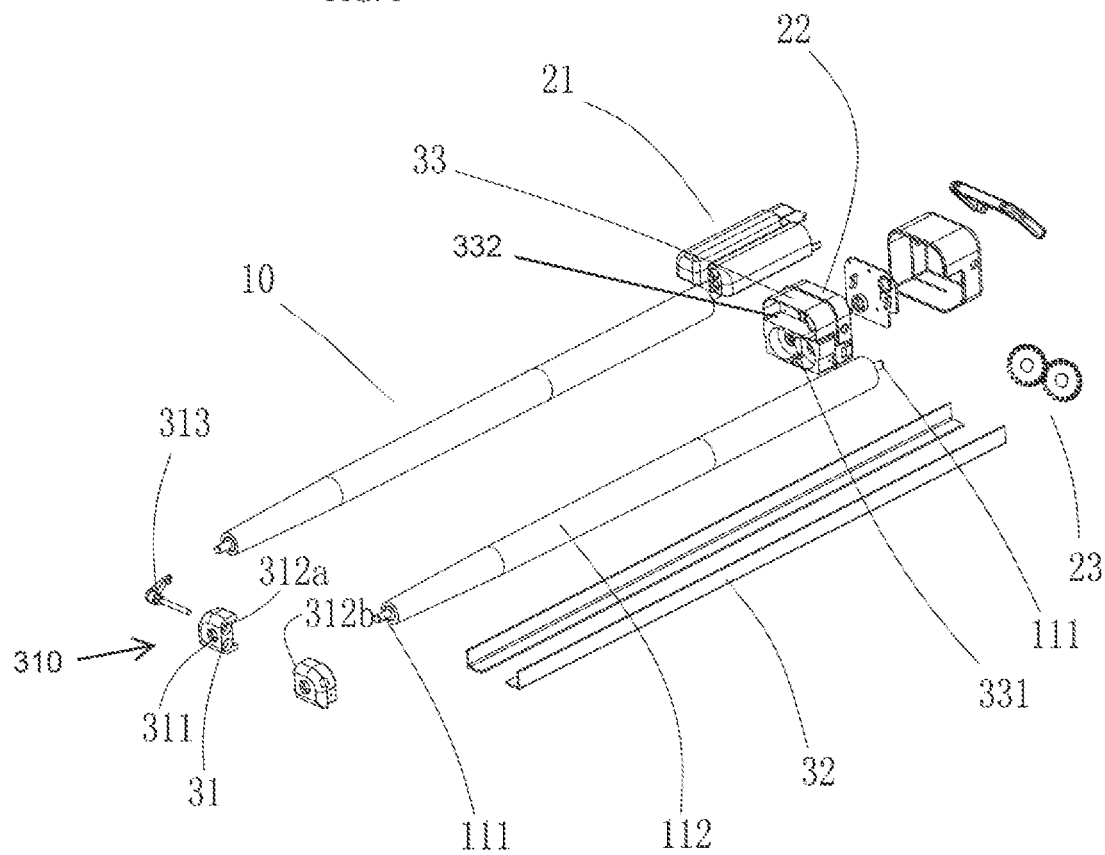
FIG. 2 is the explosive view of the squeezer in FIG. 1.
Figure 3:
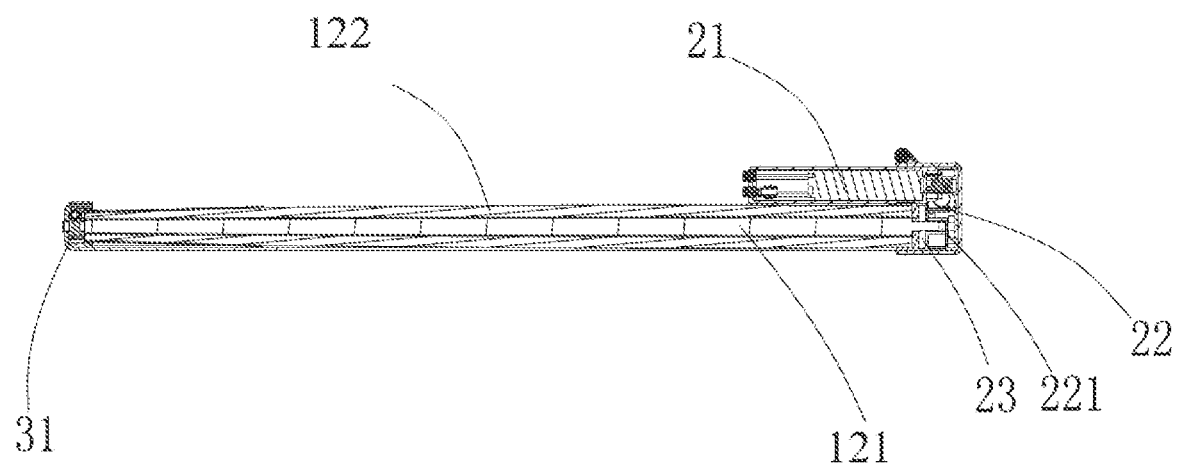
FIG. 3 is the sectional view of the squeezer in FIG. 1.

Next, the first embodiment of squeezer in this invention is described reference to FIGS. 1-3.

Figure 7:
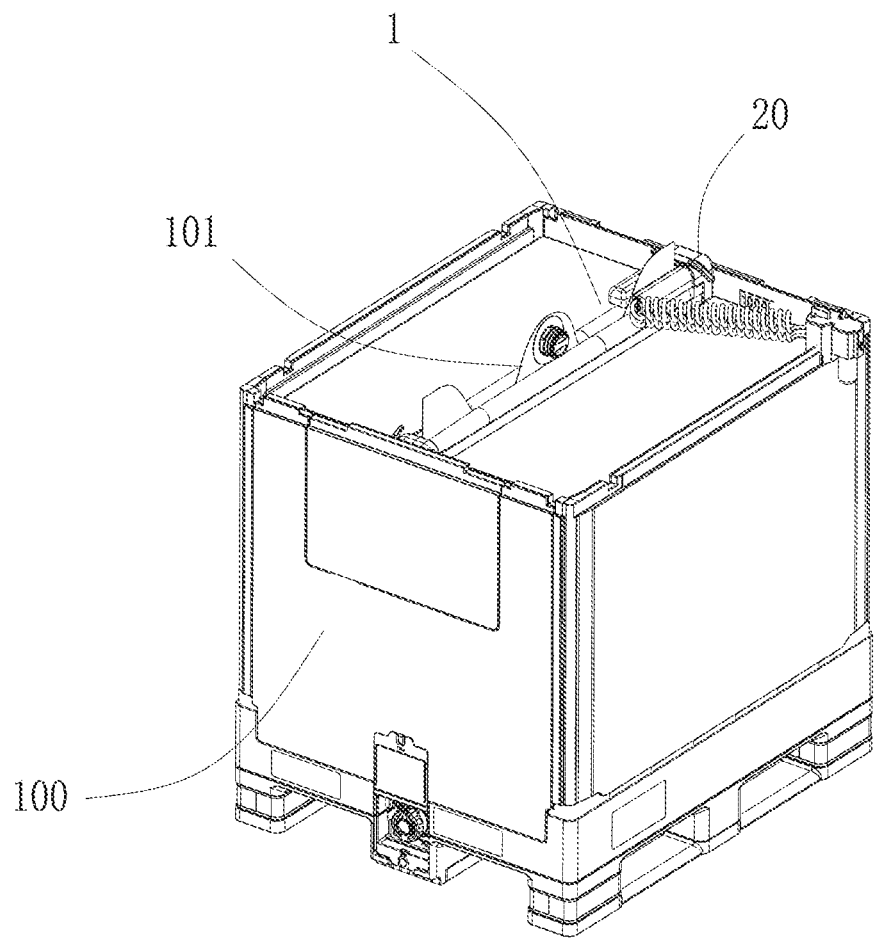
FIG. 7 is the perspective view of the fluid discharge system according to the embodiment of this invention.

As shown in FIGS. 1-3, the squeezer includes a pair of rolling shafts 10, a driving device 20 and a mounting bracket 30. Each rolling shaft 10 includes mounting parts 111 at the ends thereof and a squeezing segment 112 between the mounting parts 111. In this embodiment, the mounting parts 111 and the squeezing segment 112 are integral, however they can also be formed separately and assembled together. The rolling shaft 10 is long rod-shaped, and its dimension in the axial direction is much larger than its dimension in the radial direction, and the length of the mounting part 111 is much smaller than that of the squeezing segment 112. The squeezing segment 112 is used to contact the bag body of the liner bag 101 (as shown in FIG. 7), thereby squeezing the bag body, which will be described in detail below. The squeezing segment 112 includes a supporting shaft 121 and an elastic body 122 surrounding the supporting shaft 121. Preferably, the elastic body 122 is an elastic soft body made of rubber, resin, or other high-molecular elastic materials.

Specifically, the elastic body 122 is cylindrical in shape, and has an inner cavity with an inner diameter matching the outer diameter of the supporting rod 121. The supporting rod 121 inserts into the inner cavity of the elastic body 122. The outer surface of the supporting shaft 121 can be coated with glue. The elastic body 122 is wrapped around and attached to the entire outer surface of the supporting shaft 121, so that when the supporting shaft 121 rotates under the driving of the driving device, the elastic body 122 rotates synchronously. Alternatively, the elastic body 122 is integrated with the support shaft 121 by injection molding.

Figure 4:
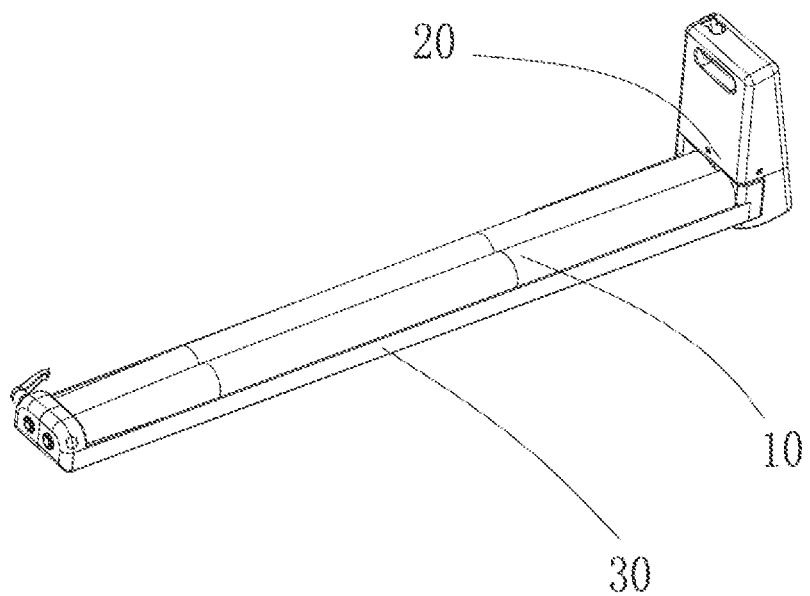
FIG. 4 is the perspective view of the squeezer according to the second embodiment of this invention.

It should be understood that the elastic body 122 of the rolling shaft 10 can also be other shape, such as ellipse, triangle, or square. The mounting part 111 is cylindrical shaft, so as to rotatably mounted in the mounting bracket 30. In this embodiment, the supporting shaft 121 is generally cylindrical, that is, the outer diameter of the supporting shaft is constant in the axial direction: while the outer diameter of the elastic body 122 changes uniformly in the axial direction, thereby forming an elastic body with a taper. However, in other embodiments, the outer diameter of the elastic body 122 can also be substantially constant in the axial direction (as shown in FIG. 4), or only the outer diameter of a part of the elastic body 122 changes uniformly in the axial direction.

In this embodiment, the mounting bracket 30 includes two first bases 31, two supporting rods 32 and a second base 33. The two supporting rods 32 connect two first bases 31 with the second base 33, that is, two ends of the supporting rods 32 are connected with the first base 31 and the second base 33 respectively. The thickness of the first base 31 and the second base 33 are set as small as possible, so that the squeezing segment 112 can be as long as possible. That is, the thickness of the first base 31 and the second base 33 are set to be slightly larger than the length of the mounting part 111.

The first base 31 has a concave recess 311 and a mounting hole 312. The second base 33 has a recess 331, an upper mounting hole 333, and a lower mounting hole 332. The mounting parts 11 at two ends of the rolling shaft 10 are mounted rotatably in the mounting holes 312 and 332 respectively, and the two ends of the squeezing segment 112 are received in the recesses 311 and 331 respectively, so that during squeezing, the ends of the squeezing segment 112 will not contact the object clamped (for example, the liner bag 101). That is, the recesses 311 and 331 function as protective parts for the ends of the squeezing segment 112, so as to ensure that the elastic body of the squeezing segment 112 will not be separated from the supporting shaft or being damaged during squeezing.

In some embodiments, the length of each of the two ends of the squeezing segment 12 received in the recesses 311 and 331 (protective parts) is 25 mm-60 mm. Preferably, the length of each of the two ends of the squeezing segment 112 received in the recesses 311 and 331 (protective parts) is 35 mm-50 mm. Preferably, the length of each of the two ends of the squeezing segment 112 received in the recesses 311 and 331 is 40 mm. Alternatively, the length of each end of the squeezing segment 112 received in the recesses 311 and 331 is 1/20 to 1/16 of the total length of the squeezing segment 112.

Preferably, the squeezing segment of one of the pair of rolling shafts 10 received in the recess 311 of the first base 31 and the squeezing segment of the other received in the recess of first base 31 are not in contact with each other; and the squeezing segment of one of the pair of rolling shafts 10 received in the recess of the second base 33 and the squeezing segment of the other received in the recess 331 of the second base 33 are not in contact with each other. Therefore, during the working process, the ends of the pair of rolling shafts will not rub against each other, thereby ensuring that the elastic body of the squeezing segment 112 will not be damaged or separated.

Of course, the mounting bracket 30 can also has other configurations. For example, the supporting rod 32 can be eliminated, the first base 31 can be an integral structure, or the second base 33 can have two separate parts.

In this embodiment, the first base 31 is provided with a locking mechanism 310. In particular, one of the first bases 31 is provided with a threaded through hole 312a, and the other is provided with a threaded hole 312b. The locking spanner 313 can be screwed into the threaded hole 312b via the threaded through hole 312a so as to operatively lock the pair of rolling shafts 10 together, and vice versa. The threaded hole 312b can be a through hole or a blind hole. Of course, the locking mechanism 310 can also in other configurations, for example locking by buckling.

In this embodiment, the driving device 20 includes a motor 21, a reducer 22, and a transmission gear 23. The motor 21 and the reducer 22 are mounted on the mounting bracket 30. In particular, the reducer 22 is mounted on the side of the second base 33 opposite to the side on which the upper recess and the lower recess are provided. Alternatively, the reducer can also be provided in the second base. One end of the motor 21 is mounted in the upper recess 332 of the second base 33, that is, the motor 21 is mounted above the rolling shaft 10, and the output shaft thereof extends parallel to the axial direction of the rolling shaft 10 and is drivingly connected with the reducer 22. The output shaft of the reducer is connected with the mounting part of the rolling shaft, so that the motor drives the reducer to rotate, and then drives the rolling shaft to rotate. The motor 21 and its outer cover (if any) is above the rolling shaft and extends from the second base toward the middle of the rolling shaft. It should be understood, the motor 21 and its outer cover (if any) can also be below the rolling shaft and extends from the second base toward the middle of the rolling shaft.

In other embodiments, the reducer 22 and the second base 33 can be formed separately and fixed together by a fixing device. The reducer 22 and the end of one of the supporting shaft 121 are drivingly engaged, for example, the end of one of the supporting shaft 121 is engaged in the driving slot 221 of the reducer 22. The transmitting gears 23 are provided on the mounting parts 11 of the two supporting shafts 121 respectively, so that when the two rolling shafts 10 are locked together, the transmitting gears on the two rolling shafts 11 are engaged with each other. In this embodiment, the transmitting gear 23 is in the lower recess 331 of the second base 33. When the motor 21 drives one of the rolling shaft 10 to rotate through the reducer 22, the other rolling shaft 10 can be driven to rotate, so as to apply squeezing force to the object clamped. Of course, in some embodiments, the driving device 20 may not include the transmitting gear 23. Alternatively, two driving slots may be provided in the reducer, which are respectively drivingly engaged with the ends of the pair of rolling shafts 10.

The Second Embodiment

Next, the second embodiment of the squeezer in this invention will be described reference to FIGS. 4, 5 and 6. The main difference between the second embodiment and the first embodiment are the driving device and its mounting position. In the second embodiment, the motor 21 in the driving device is arranged above the reducer 22, and the output shaft of the motor is connected with the reducer 22 and extends upward (that is vertically or obliquely) from the reducer 22. The cover 24 of the motor 21 also extends upward from the reducer 22. Therefore, the motor 21 per se and the cover will not increase the total length of the squeezer, so that the effective length (that is, the length that can be used to squeeze) of the squeezing segment 112 is longer. Secondly, the structures of the second base 33 and the reducer 22 are also slightly different. In the first embodiment, the second base 33 is located on the side of the reducer 22 close to the squeezing segment 112 and receives both mounting parts 111 of one pair of rolling shafts 10. While, in the second embodiment, the second base 33 is detachably mounted to the reducer 22, and the mounting part 111 of one of the pair of rolling shafts 10 is received in the reducer 22 and is in transmission engaged with the reducer; and the mounting part 111 of the other rolling shaft 10 is rotatably mounted in the second base 33. Thirdly, two ends of the elastic body 12 are received in the first base 31, the second base 33 and the reducer 22 respectively, so that during squeezing, the ends of the elastic body 12 will not contact with the object clamped (for example the liner bag 101). Therefore, during squeezing, the elastic body 12 will not be separated from the rolling shaft 10. For other details, refer to the above description, which will be further described here.

It should be understood, in this embodiment, the motor 21 in the driving device is arranged below the reducer 22, and the output shaft thereof is connected with the reducer 22 and extends downward (that is vertically or obliquely) from the reducer 22. The cover 24 of the motor also extends downward from the reducer 22.

Figure 8:
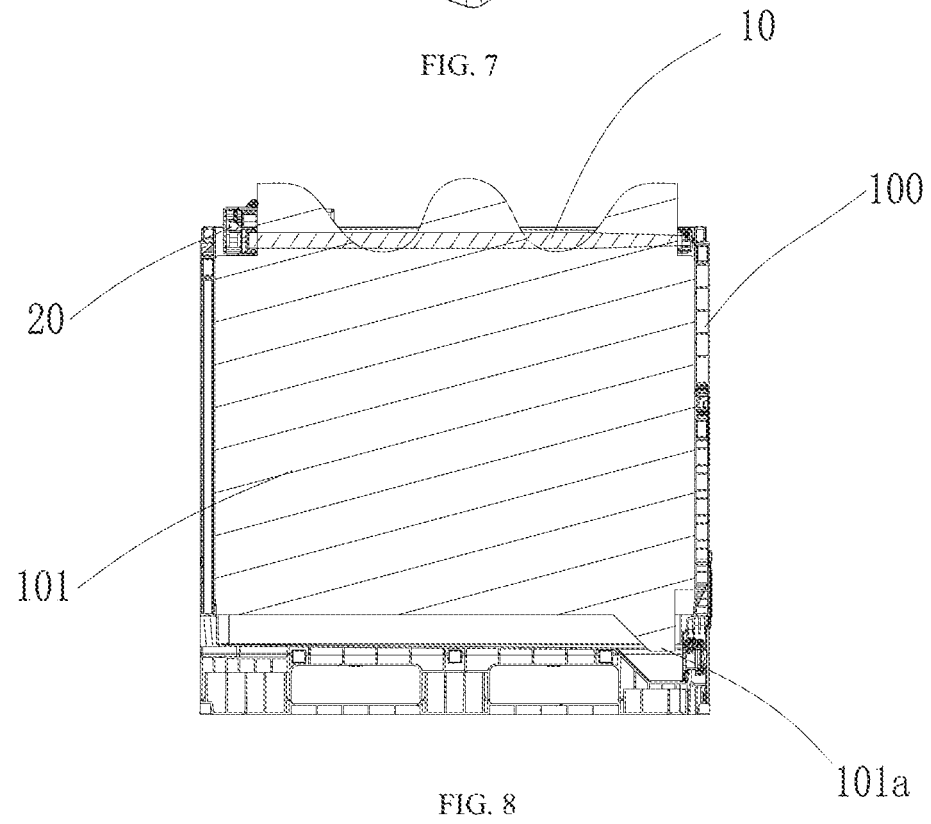
FIG. 8 is a sectional view of the fluid discharge system in FIG. 7.
Figure 9:
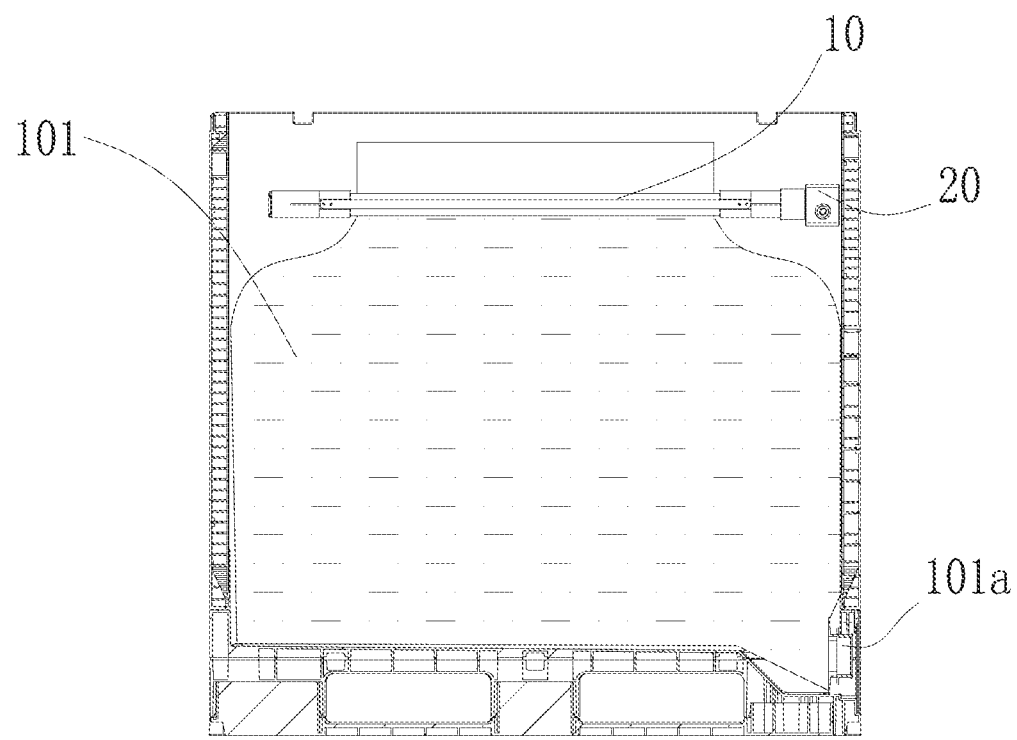
FIGS. 9-11 are the cross-section views of the fluid discharge system according to the embodiment of this invention, showing the different phases during liquid discharging.
Figure 10:
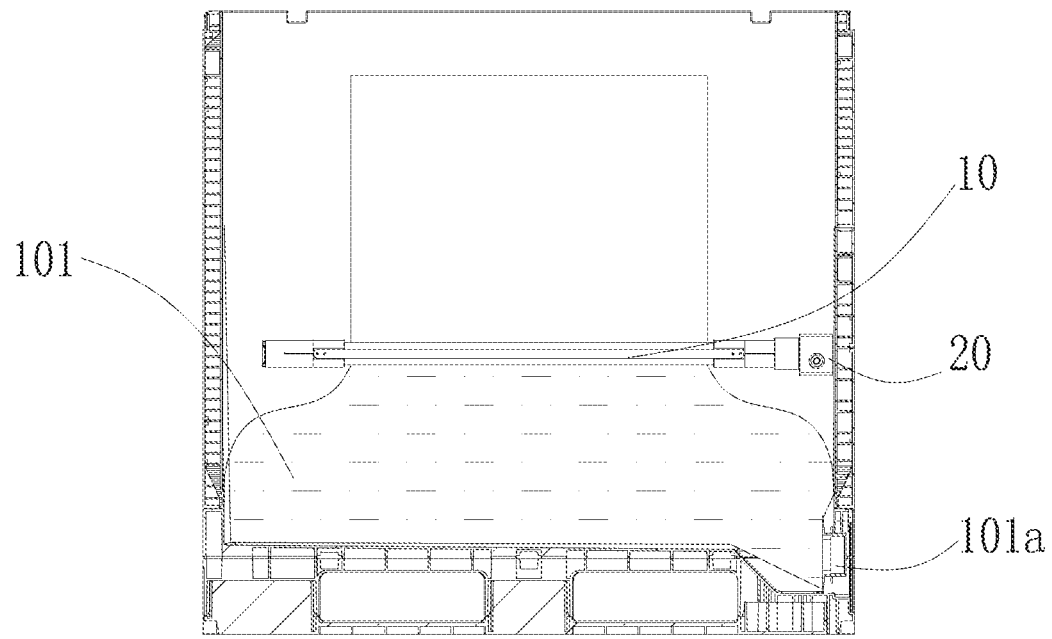
Figure 11:
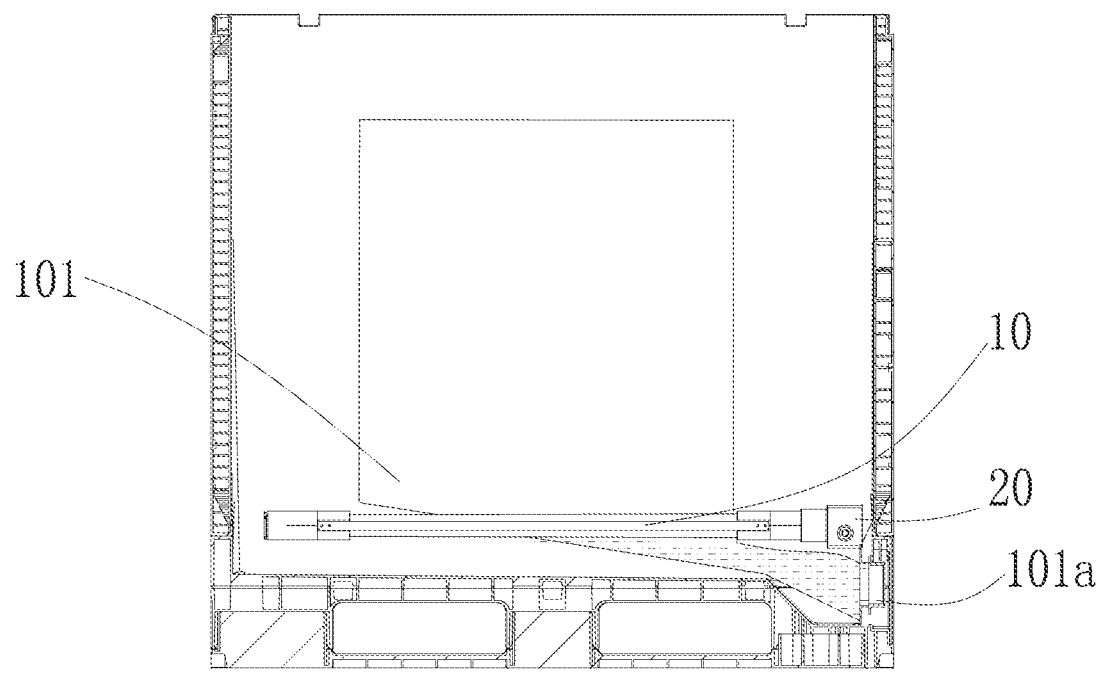

FIG. 7 is the perspective view of the discharge system according to the embodiment of this invention. FIG. 8 is a sectional view of the discharge system in FIG. 7. FIGS. 9-11 are the cross-section views of the fluid discharge system according to the embodiment of this invention, showing the different phases during fluid discharging.

As shown in FIGS. 7 and 8, the fluid discharge system may include a container 100, a liner bag 101 and a squeezer 1. The container 100 is generally an intermediate bulk container. The liner bag 101 is provided with a discharge port 101a and is installed in the container 100. The squeezer 1 includes a pair of rolling shafts 10 and a driving device 20. With reference to FIGS. 7-11, the discharge process of the fluid discharge system will be described. Firstly, the liner bag 101 is clamped between the pair of rolling shafts 10 (as shown in FIG. 7). In particular, the pair of rolling shafts 10 are separated by the locking spanner, and then the upper part of the liner bag 101 is clamped in the squeezer 1 of the container 100, then the pair of rolling shafts 10 are locked together by the locking spanner. Next, the driving device 20 is activated, when driven by the driving device 20, the pair of rolling shafts 10 of the squeezer rotate downwardly and oppositely and squeeze the bag of the liner bag 101, so as to squeeze the liquid in the liner bag 101, so as to discharge the liquid from the discharge port 101a. During fluid discharging, as the liquid in the liner bag decreases, the pair of rolling shafts 10 automatically descend with the liquid level under the driving of the driving device 20 and squeeze the liquid (as shown in FIGS. 9-11). During the squeezing process, due to the protective parts, the elastic body and supporting shaft of the rolling shaft 10 will not be separated or damaged.

Figure 5:
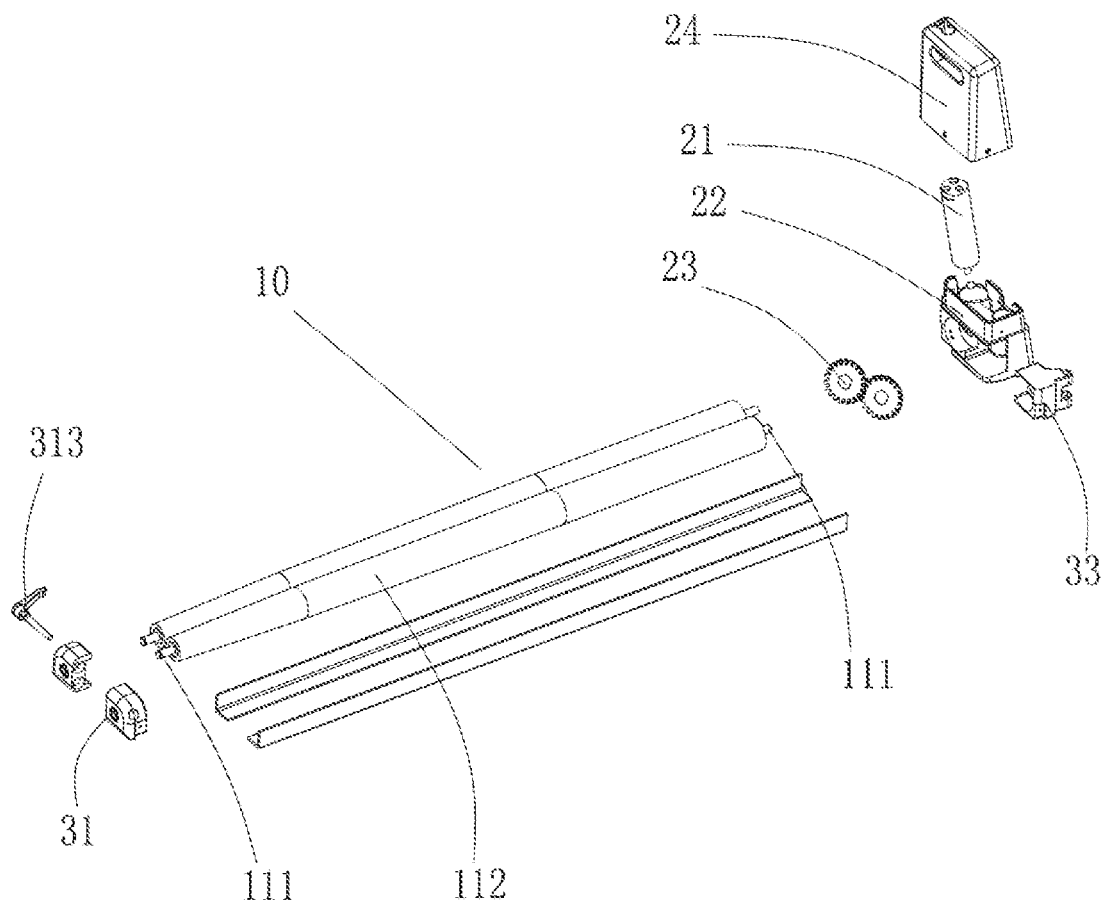
FIG. 5 is the explosive view of the squeezer in FIG. 4.
Figure 6:
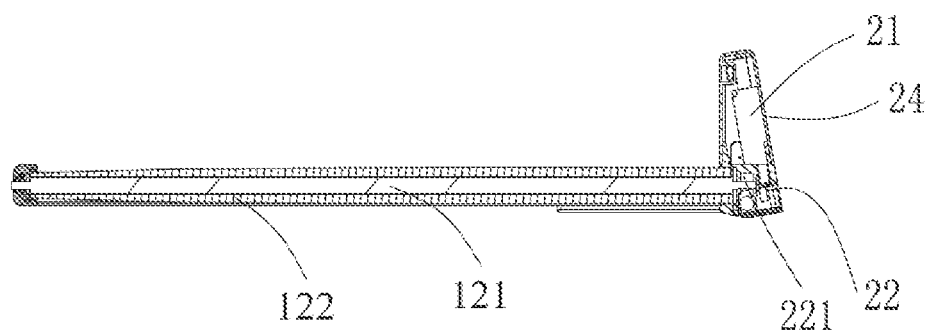
FIG. 6 is the sectional view of the squeezer in FIG. 4.
Figure 12:
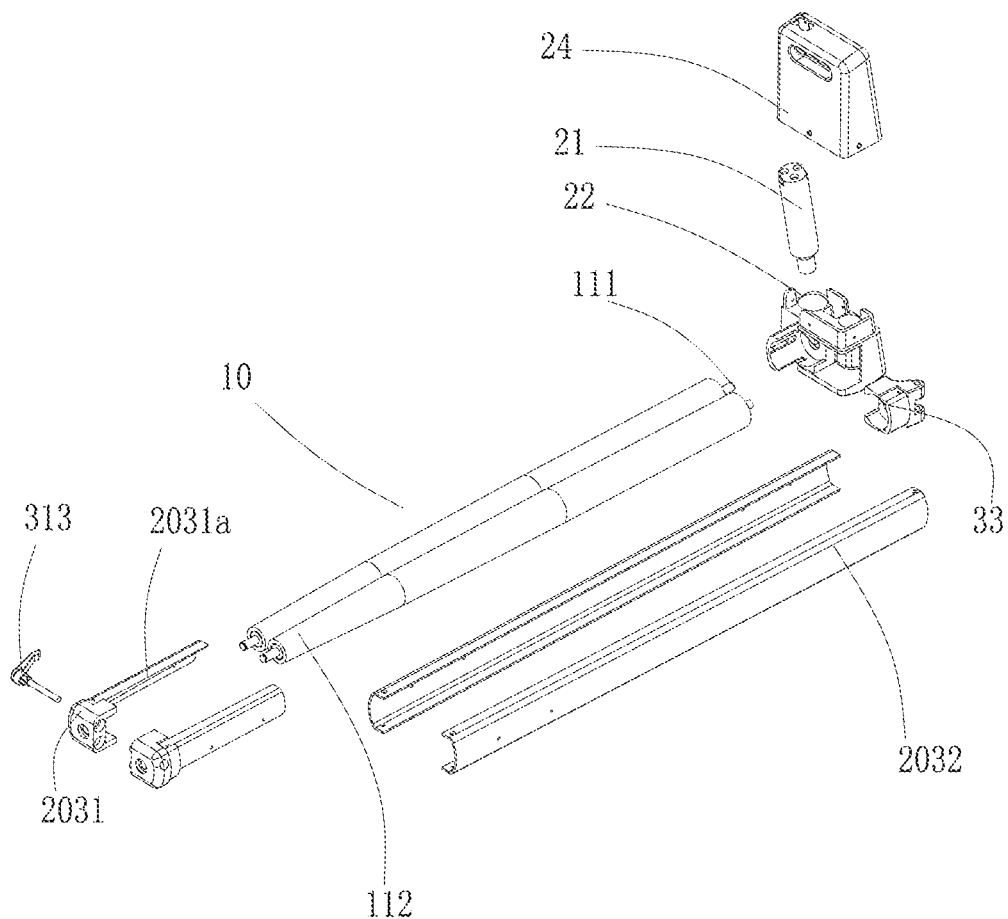
Figure 13:
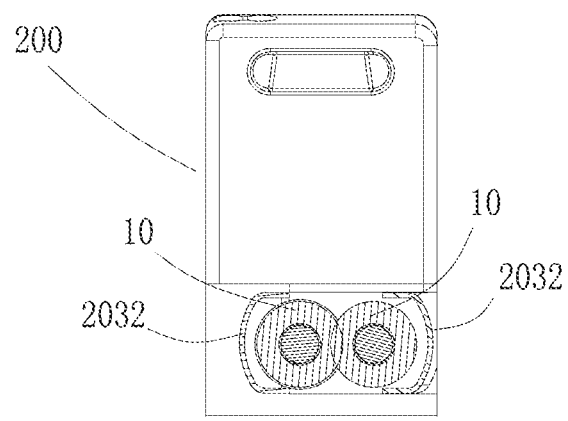

FIGS. 12-13 are schematic diagrams showing the variant of the squeezer in FIGS. 4-6. The differences between the embodiment shown in FIGS. 12-13 and the embodiment shown in FIGS. 4-6 lie in the structure of the mounting bracket 2030, in particular the structure of the supporting rod. As shown in FIG. 13, in this embodiment, the cross section of the supporting rod 2032 in the squeezer 200 is different from that of the supporting rod shown in FIGS. 2 and 4. In this embodiment, the cross section of the supporting rod 2032 is U-shaped. Thereby, the supporting rod 2032 can surround the outer side of the rolling shaft, preventing the outer surface of the rolling shaft from contacting the clamped object, that is, spacing the outer side of the rolling shaft from the clamped object, and further preventing hands of the operator from being clamped by the rolling shafts. Here, the outer side refers to the side of the rolling shaft opposite to the side contacting the clamped object. In this embodiment, in order to facilitate the installation of the supporting rod 2032, a supporting rod mounting portion 2031a extends from the base 2031.

In this embodiment, the cross section of the supporting rod 2032 can also be C-shaped, or the protective part can have other shapes or configurations, as long as it can surround the outer side of the rolling shaft, such that during the squeezing of the squeezer, and the outer side of the rolling shaft is separate from the clamped object.

In this text, the motor of the driving device is stalled around the rolling shaft, such that the motor does not substantially occupy a length beyond the rolling shaft, so that the roller can be made longer, so that the effective squeezing length of the rolling shaft is longer, improving the squeezing effect. Herein, the motor may be located above, below or on one side of the rolling shaft, where the side refers to the side except the axial ends of the rolling shaft. Preferably, the motor is arranged such that at least a part of its projection in a direction perpendicular to the axis of the rolling shaft overlaps with the projection of the rolling shaft in a direction perpendicular to the axis of the rolling shaft. In this way, the effective squeezing length of the rolling shaft can be increased.

The preferred embodiments of the present invention have been described in detail above, but it should be understood that those skilled in the art can make various changes or modifications of the present invention after reading the above teachings of the present invention. These equivalent forms also fall within the scope defined by the claims appended hereto.

The invention claimed is:

1. A squeezer, comprising:
a pair of rolling shafts, a driving device and a mounting bracket,
wherein the pair of rolling shafts being rotatably mounted to the mounting bracket, each rolling shaft having a mounting part at each end and a squeezing segment located between the mounting parts;
the squeezing segment including a supporting shaft and an elastic body surrounding the supporting shaft;
the pair of rollers being capable of operatively clamping an object to be clamped between the squeezing segments and oppositely being rotated by the driving device to apply a squeezing force to the object clamped, and
the driving device including a motor, wherein the motor being mounted around the rolling shaft,
wherein the mounting bracket comprises two first bases, a second base and a locking mechanism, wherein one end of the rolling shaft is rotatably mounted to the first base, the other end is rotatably mounted to the second base, and the locking mechanism is used to operatively lock or release the pair of rolling shafts.

2. The squeezer according to claim 1, wherein the motor is arranged such that at least a part of the motor's projection in a direction perpendicular to the axis of the rolling shaft overlaps with the projection of the rolling shaft in a direction perpendicular to the axis of the rolling shaft.

3. The squeezer according to claim 1, wherein the motor is located below, above, or a side of the rolling shaft.

4. The squeezer according to claim 1, wherein the driving device is arranged at the second base.

5. The squeezer according to claim 4, wherein the motor extends from the second base toward the middle portion of the rolling shaft.

6. The squeezer according to claim 4, wherein one side of the second base is provided with an upper recess and a lower recess below the upper recess, wherein one end of the motor is mounted in the upper recess, and the rolling shaft is installed to the lower recess.

7. The squeezer according to claim 6, wherein the driving device further includes a reducer, wherein the reducer is mounted to the side of the second base which is opposite to the side where the upper recess and the lower recess is provided, and a driving slot of the reducer is connected to the rolling shaft.

8. The squeezer according to claim 1, wherein the driving device further includes a reducer, wherein the motor is arranged above the reducer, and the output shaft of the motor is connected with the reducer and extends upward from the reducer.

9. The squeezer according to claim 8, wherein one of the pair of rolling shafts is received in the reducer, and the other is received in the second base.

10. The squeezer according to claim 8, wherein the motor has a cover arranged above the reducer and extending upward from the reducer.

11. The squeezer according to claim 1, wherein the mounting bracket further comprises two supporting rods, wherein two ends of each of the two supporting rods are connected to the first base and the second base respectively.

12. The squeezer according to claim 1, wherein the squeezer further comprises a protective device, wherein the protective device is provided to surround at least the outer side of the rolling shaft so that the outer side of the rolling shaft is separated from the object clamped during squeezing of the squeezer.

13. The squeezer according to claim 12, wherein the mounting bracket further comprises a supporting rod, wherein two ends of the supporting rod are connected to the first base and the second base respectively, and the cross section of the supporting rod is U-shaped or C-shaped.

14. A fluid discharge system, comprising a container and an liner bag, wherein the liner bag being provided with a discharge port and installed in the container, characterized in that, the fluid discharge system further comprises the squeezer according to claim 1, wherein the pair of rolling shafts are able to operatively clamp the liner bag between the squeezing segments and are able to oppositely rotated by the driving device to apply a squeeze force to the liner bag.

15. The fluid discharge system according to claim 14, wherein the motor is arranged such that at least a part of the motor's projection in a direction perpendicular to the axis of the rolling shaft overlaps with the projection of the rolling shaft in a direction perpendicular to the axis of the rolling shaft.

16. The fluid discharge system according to claim 15, wherein the motor is located below, above, or a side of the rolling shaft.

17. The fluid discharge system according to claim 14, the driving device further includes a reducer, wherein the motor is arranged above the reducer, and the output shaft of the motor is connected with the reducer and extends upward from the reducer.

18. The fluid discharge system according to claim 14, wherein the mounting bracket further comprises two supporting rods, wherein two ends of each of the two supporting rods are connected to the first base and the second base respectively.

19. The fluid discharge system according to claim 14, wherein the squeezer further comprises a protective device, wherein the protective device is provided to surround at least the outer side of the rolling shaft so that the outer side of the rolling shaft is separated from the object clamped during squeezing of the squeezer.

20. The fluid discharge system according to claim 14, wherein the mounting bracket further comprises a supporting rod, wherein two ends of the supporting rod are connected to the first base and the second base respectively, and the cross section of the supporting rod is U-shaped or C-shaped.

* * * * *